Figure 1:
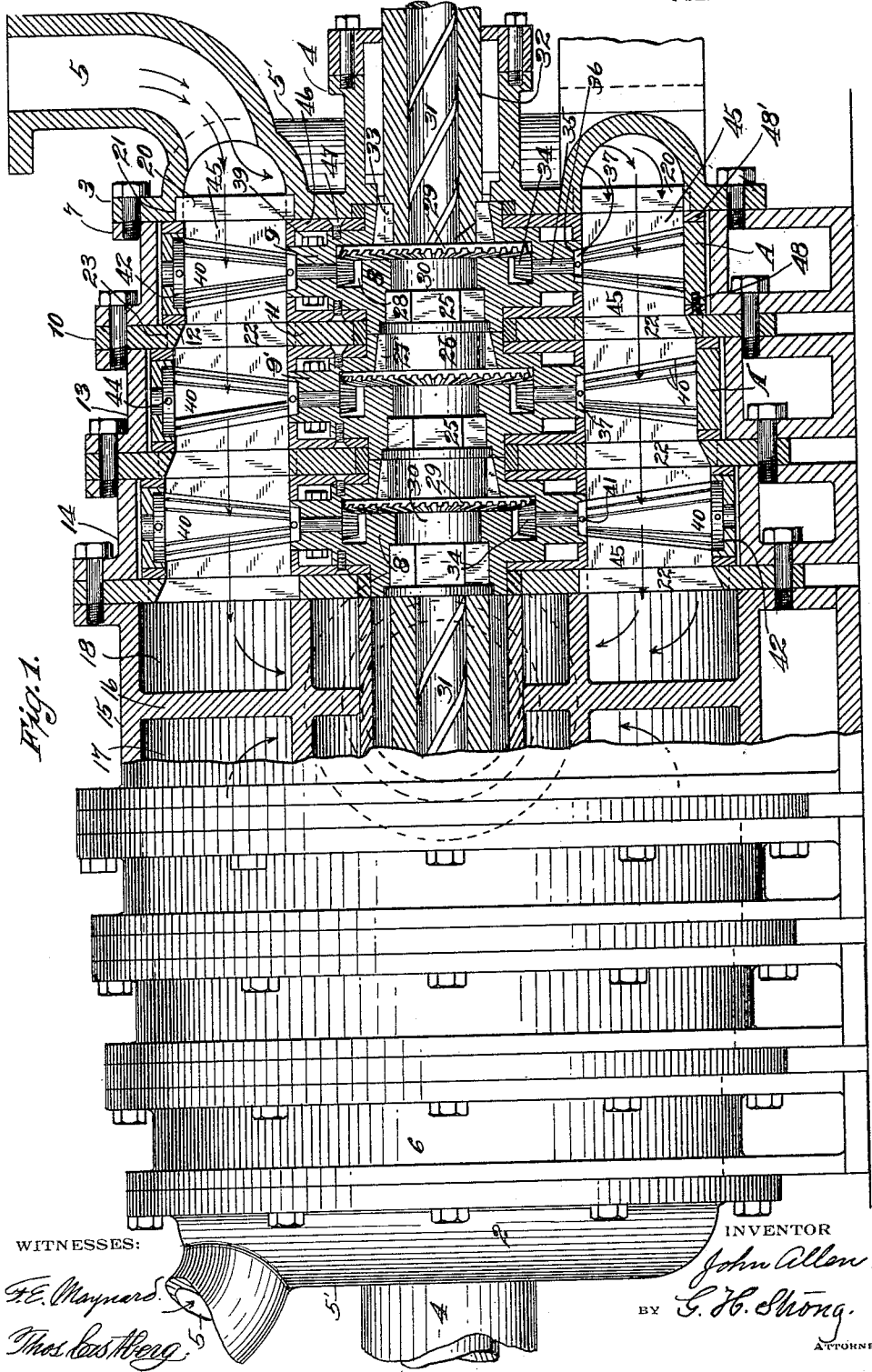

J. ALLEN.
REVERSIBLE TURBINE ENGINE.
APPLICATION FILED DEC. 22, 1913.

1,127,386.

Patented Feb. 9, 1915.
3 SHEETS—SHEET 1.

WITNESSES:
F. E. Maynard
Thos. Castberg

INVENTOR
John Allen
BY G. H. Strong
ATTORNEY

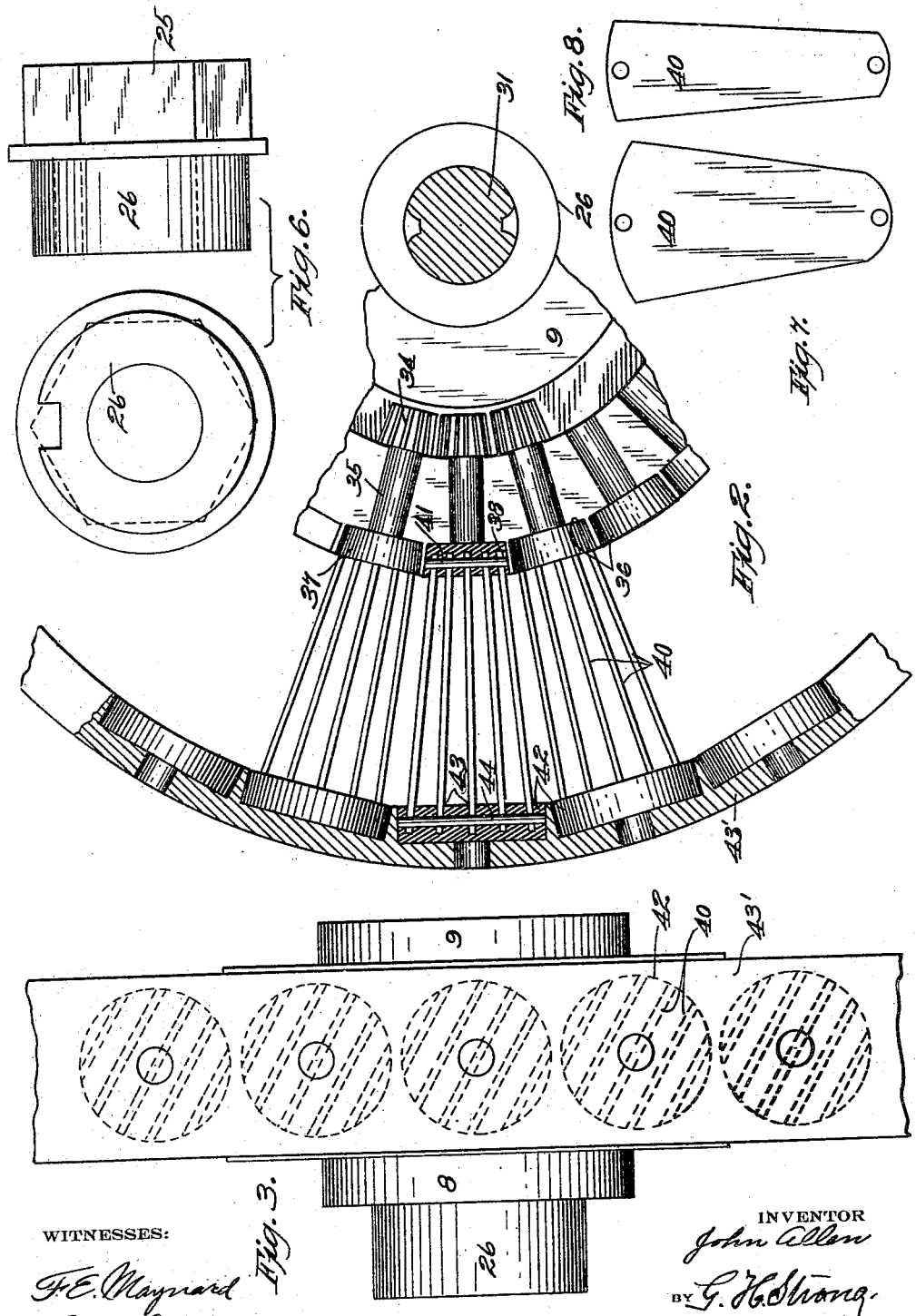

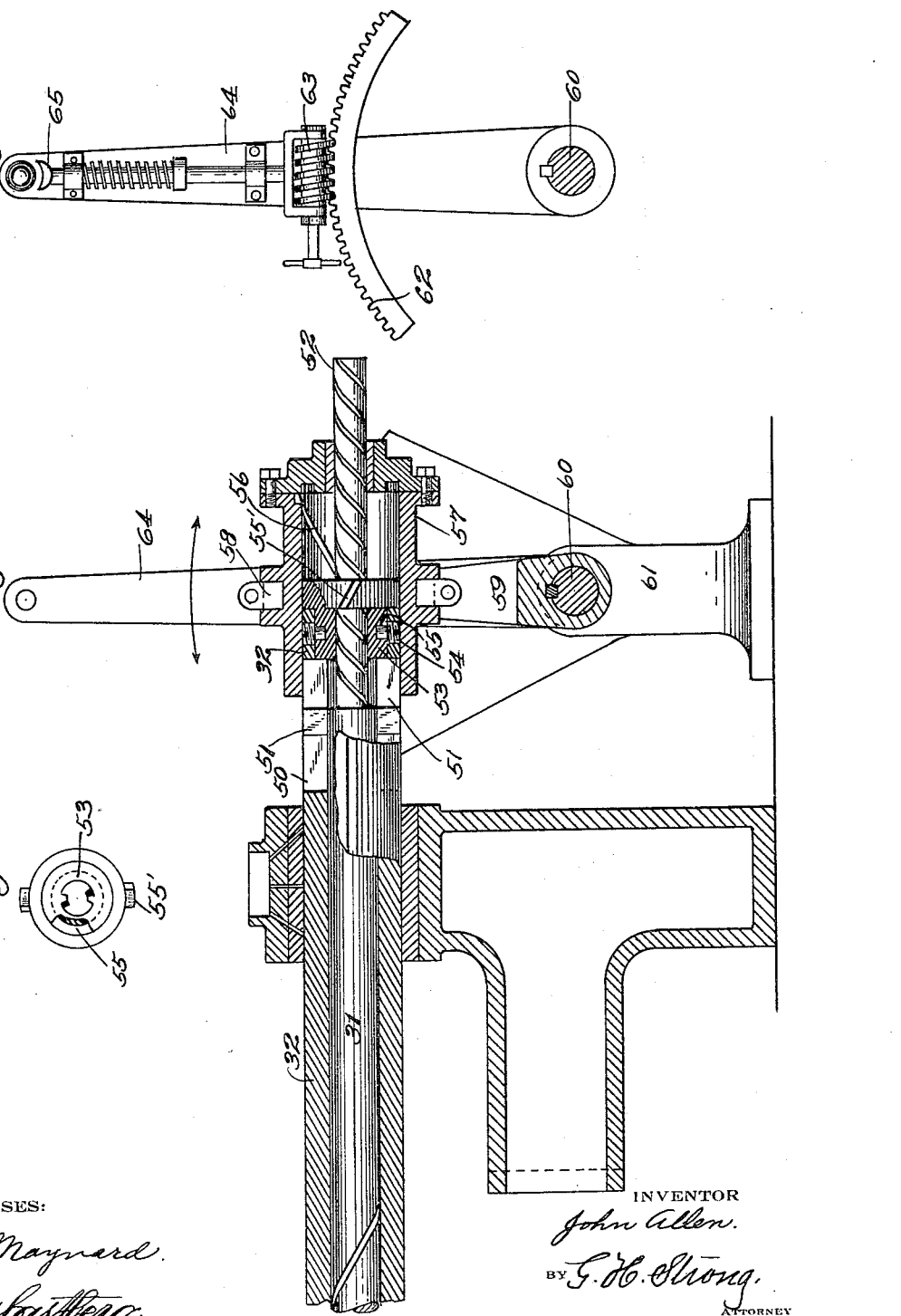

UNITED STATES PATENT OFFICE.

JOHN ALLEN, OF SAN FRANCISCO, CALIFORNIA.

REVERSIBLE TURBINE-ENGINE.

1,127,386.      Specification of Letters Patent.      Patented Feb. 9, 1915.

Application filed December 22, 1913. Serial No. 808,134.

*To all whom it may concern:*

Be it known that I, JOHN ALLEN, a citizen of the United States, residing at the city and county of San Francisco and State of California, have invented new and useful Improvements in Reversible Turbine-Engines, of which the following is a specification.

This invention relates to fluid-propelled engines, and particularly to turbines of the type involving rotors with peripheral radial blades upon which impinge a fluid traveling with high velocity, and which engine has fixed guide vanes through which the steam is directed toward and from the impingement blades.

The present invention comprises a turbine fluid motor with means for reversing the direction of rotation of the same, said means including impingement blades radially mounted about the periphery of a rotor, with means whereby the angle of the blades with relation to the axis of the rotor may be varied, whereby variable speed may be produced during either direction of rotation.

It is an object of the present invention to provide such a variable speed and reversible turbine fluid engine in which the speed changing and direction controlling mechanism may be readily and positively actuated during the operation of the rotor upon which the impingement blades are mounted, and to provide reliable, practicable and safe means for accomplishing the change of angularity of the rotor blades during the operation of the rotor.

It is a further object of the present invention to provide a turbine motor with sets of rotors so connected to the power shaft that end-thrust of the rotor elements and the shaft are practically eliminated by the balancing action obtained, by so designing the engine that sets of the rotors are subjected to oppositely traveling streams of the impelling fluid.

A further object of the invention is to provide removable impeller blades, which are arranged in individual groups about the periphery of the rotors, the groups being of frusto-conoidal form which are flanked on each side of the rotor by radial laterally spaced direction vanes fixed to the rotor and designed to form frusto-conoidal chambers within which the conoidal groups of blades are mounted and turnable with relation to the vanes of the rotors.

The invention consists of the parts and the construction and combination of parts as hereinafter more fully described and claimed, having reference to the accompanying drawings, in which, Figure 1 is a side elevation and partial longitudinal vertical section of the engine. Fig. 2 is a detail view partly in section of one of the rotors with a series of grouped impelling blades. Fig. 3 is a side edge view of the rotor. Fig. 4 is a side elevation in partial section of the reversing mechanism. Fig. 5 is a cross-section through the reversing lever showing the locking gear. Fig. 6 is a detail view of one of the rotor couplers. Figs. 7 and 8 are detail views of one of the groups of impingement blades. Fig. 9 is a detail view of the tumbler nut.

The present invention comprises a built-up casing of end sections or heads 2—3, each provided with suitable central journal portions 4, and with steam or other motive fluid inlet elbows 5, the heads 2—3 being respectively bolted to annular rings 6—7 forming the first stage chambers of the engine within which there are turnably mounted first stage rotors A, comprising sectional central bodies or hub portions 8—9, the outermost or end rotors being of substantially the same proportions.

To the inner side of the first chamber 7 there is bolted or otherwise attached concentric distance rings 10—11, the outermost one of which is beveled at 12, with the smaller diameter arranged adjacent to the chamber 7, so that the space or opening between the facing edges of the rings 10—11 substantially expands outwardly into the second chamber or stage 13 of the engine, which is of larger diameter than the first stage 7, and beyond which or near the center of the engine is the third or final stage chamber 14 of the engine; there being a central discharge housing or chamber 15 divided by a wall 16 to form discharge chambers 17 and 18 into which latter chamber steam or other motive fluid will finally discharge after entering the right side of the engine at the inlet 5 and passing through the rotors hereinafter more fully described, and through each of the successive chambers 7—13 and 14.

The steam entering the inlet 5 of the head 110

3 at the right side of the engine passes into an annular high-pressure chamber 5', from which it is directed laterally into the first stage chamber 7 through spaces produced between a multiplicity of substantially uniformly spaced radial guide vanes 20, which are mounted in seats 21 provided therefor on the inner face of the head 3. Similar guide vanes 22 are removably and securely mounted in respective seats 23, formed for the reception of same at the facing edges of the spacing rings or distance plates 10 and 11, so that the combined members 10—11 and 22 form substantially rigid transversely and intermediately perforated or slotted members or blades between the engine chambers 7 and 13; the steam from the chamber 7 passing through the apertures between the fixed blades 22 and entering the next chamber or succeeding stage 13, the remaining chambers 13—14 and 15 being spaced and separated by distance rings 10 differing only from the one just described in size, so that the description for one will cover all.

In each of the chambers 13 and 14 there is rotatably mounted a rotor of similar construction but of different proportions from that previously mentioned, and which will now be described more in detail.

The rotors A include the body or hub portions 8 and 9, the former of which is centrally chambered to receive a polygonal coupler 25, which has a cylindrical portion 26 at one end, and adjustable in the cylindrical bore 27 of the next adjacent rotor body section as 9', the rotor body 9' being keyed, as at 27', to the cylindrical part 26 of the coupler, and this latter by its nut or polygonal body part 25, thus substantially but separably uniting the body member 8 on the right-hand of the first rotor A with the body section 9' on the left-hand of the next succeeding rotor A; thus each of the rotor hub sections 9—9' are similar in design and are adapted to be fit or keyed upon the coupling device 25, so that the separate rotors are rigidly joined for unitary movement.

The rotor sections 8—9 are so formed as to produce between their adjacent inner faces a chamber 28, in which there is turnably mounted a gear 29, which has a central hub portion 30 threaded to engage a worm or innermost screw shaft 31, which is slidably mounted within the main or driving shaft 32 and extends through the several couplers 25. The shaft 32 is supported in the journal 4 of the engine head 3, and its inner end is keyed at 33 to the section 9 of the right-hand rotor A, so that rotation of the rotor is transmitted to the shaft 32 from which power may be derived in any suitable manner.

When the worm shaft 31 is shifted longitudinally through the center of the rotors and the couplers 25 which slidably fit the worm 31, the gear 29, of which there is one for each of the rotors A, will revolve with relative independent movement as its respective rotor; this rotary movement being transmitted to a pinion 34 which is integral with or secured upon a spindle 35 radially mounted and journaled in and between the rotor bodies 8—9, the peripheral portions of which bodies are provided with a plurality of circular seats 36 for the reception of buttons or heads 37, secured to or formed on the end of each spindle 35, these buttons being transversely slotted, as at 38, as shown in the detail Figs. 7—8. The several radially disposed spindles 35 are adjustable between the separable rotor body sections 8—9, which latter are securely fastened together by bolts 39, as shown at their peripheral portions.

Transversely mounted on the seats or slots 38 of the heads 37 of the spindles 35 is a plurality of radially divergent and suitably spaced impingement blades 40, Figs. 7—8, the lower ends of which are shown as rounded and perforated for adjustment upon the seats 38, and adapted to be locked therein by a cross-pin 41 or other suitable means, the radial blades 40 being made of the desired length and preferably arranged in groups or sets, each rigidly connected to its respective spindle head 37, each group of blades being of frusto-conoidal form, the smaller end of which is the lower button 37, and the upper end of which is formed by a cap or bearing 42 which is provided with transverse parallel slots or seats 43, Figs. 7—8, for the reception of the upper larger end of its conoidal group of blades, the cap of the upper bearing 42 being turnably mounted in an annulus or running ring 43', which is provided on its inner face with pockets for the reception of the caps 42, the blades 40 of each conoidal group being pinned, as at 44, in their respective caps 42.

Since the blades 40 are arranged in tapering groups between the superposed heads 37 and caps 42, and since the maximum and minimum diameters of the conoidal groups are less than the space between the adjacent edges of the guide vanes 20 and 22, I introduce and provide other guide vanes 45 to fill the space intervening between the inner edges of the fixed vanes 20—22 and the edges of the groups of blades 40, which groups are relatively turnable with their respective spindles 35, so that the angular relation of the divergent radial blades 40 can be readily varied with relation to the axis of the engine shaft 32, the turning movement of the groups of blades 40 being produced when the beveled gears 29 are turned independently of and within the rotor bodies. The filler vanes 45 are radially disposed normally in conformity to the disposition of fixed blades 20—22, but are mounted at their innermost and widest ends in flat supporting rings 46, removably although rigidly secured by screws 47 to the opposite or outer faces of the companion sections 8—9 of each rotor, the outer ends of the filler vanes 45 being mounted in the edge of the outer running ring 43 or rings 48' detachably secured thereto, as by screws 48.

Thus the order of assembling may be described as follows: The several radial groups of blades 40 will be positioned so that the outer bearings 42 will be positioned in the outer carrier or runner ring 43, and then one or the other of the rotor hub sections adjusted against the spindles 35, so as to properly aline the same, whereupon the beveled gear 29 would be meshed with the several pinions 34, and thereupon the opposite body section, as 9, may be adjusted in position and bolted to the other section, as 8. The bearing rings 46, with the several filler vanes 45, may then be secured to the opposite faces of the body sections 8—9, and the outer bearing rings 48' secured to the runner ring 43; this entire assemblage comprising substantially one rotor or power unit member which would include steam passageways between the laterally spaced filler vanes 45, which are adapted to run uniformly and immovably with the rotor A, while the central groups of blades 40 are turnable with relation to the revolving rotor vanes 45, the filler vanes 45 being varied in design and proportion so that they form a conoidal chamber for the reception of the cluster of blades 40.

In the present mounting the right-hand rotor A is keyed at 33 to the engine shaft 32, and the next inner rotor A is keyed at its hub 9' through a key 27' to the coupler 25, the polygonal portion of which fits a complementary socket or chamber in the body section 8 of the first rotor, the remaining individual rotors being substantially and rigidly joined for uniform rotation by respective couplers 25—26, so that all of the rotors act conjointly in transmitting motion derived from the impulse of the moving fluid acting against the angularly adjustable blades 40 to the driving shaft 32, at one or the other end of the engine.

It will be seen that when the blades 40 are adjusted in planes radial from the engine shaft, that the impelling fluid will traverse the spaces between the fixed vanes 20 and the spaces between the rotor vanes 45 of the rotors, and the adjustable impingement blade 40. and according to the degree of angular relation of the blades 40 to the axis of the engine so will be the force with which the motive fluid will react upon the blades and drive the shaft. The reverse motion of the engine shaft 32 is accomplished by the setting of the adjustable blades 40 to intersect the axis of the shaft at an angle opposite to that at which they were set for previous rotation.

Any suitable means may be employed for changing the angular position of the blades 40 with relation to the axis of the engine, and to that end I have introduced the gear set 29—34 and the shiftable worm shaft 31. Means for shifting the worm shaft is shown in Fig. 4, as follows: The outer end of the main shaft 32 is internally splined, as at 50, to receive keys 51, rigid on the contiguous portion of the shift screw 31, which latter is shown as having an end portion threaded at 52 to fit a tumbler or nut 53, turnably fitting the outer end of the shaft 32, although held against longitudinal movement therein by stop screws 54 running in an annular groove 55 of the tumbler or nut 53. The tumbler 53 is provided with peripheral, diagonal lugs 55' which engage complementary cam or spiral grooves 56 formed in a box 57, which is slidably keyed upon the outer end of the shaft 32 and rotatably turnable therewith. The shift box 57 may be moved longitudinally upon the shaft 32 during rotation therewith, to effect a turning movement through the cam lugs 55' of the tumbler or nut 53, which turning movement will cause the reciprocation of the complementary threaded portion 52 engaging the interior of the nut 53. As the nut 53 turns and forces the shaft 31 inwardly or outwardly, this movement thereof will cause the gear 29, the hub of which fits the central worm 31, to revolve in one direction or the other, and thus through means of the pinions 34 simultaneously and uniformly rotate the several groups of blades 40 in their respective bearing rings or members, to change their angle with relation to the axis of the engine and proportionally increase or decrease the speed or direction of rotation of the rotors.

For the purpose of neutralizing the tendency of the pressure of the rotors against the angularly adjusted blades 40 to turn the same, the pressure of this turning moment, being transmitted to the gear 29, is off-set and counteracted beneficially by making the pitch of the threads of the part 31 opposite to the pitch of the threads at 56, so that the pressure of the motive fluid against the blades 40 and their turning tendency on the gear 29, and this reacting on the complementary threaded portion 31 in the nut hub 30, will be taken up and resisted by the engagement of the oppositely turned threads 56 with the tumbler or nut member 53. These oppositely pitched threads 31 and 56 reacting through their complementary parts to neutralize the turning moment of the blades 40 about the axis of their spindles 35.

The shifter box 57 is shown as circumferentially embraced by a shifter ring 58, journaled in a yoke lever 59, which is mounted on a suitable pivot 60 of a standard 61, which is provided with a fixed rack 62 engageable by a lock worm 63, slidably mounted upon an operating lever 64, secured to the journal pin 60, the screw 63 being readily and quickly lifted from locking engagement with the worm 62 by any suitable lift grip 65, mounted on the shift lever 64.

Having thus described my invention what I claim and desire to secure by Letters Patent is:

1. A turbine engine comprising a casing with inlet and outlet ports for a motive fluid and circumferentially spaced radial guide vanes interposed in the sides of the casing of the engine for giving direction to the stream of motive fluid, a rotor turnably mounted within the casing and having peripheral spaced radial impeller blades with supporting bearings at their inner and outer ends wherein they may be angularly turned from one side to the other of the plane of the axis of the rotor, means for turning the blades and for holding the same in adjusted position, said blade actuating means comprising spindles journaled in the rotor and to which the blades are rigidly connected, and means for turning the spindles in their journals.

2. A turbine engine comprising a casing with inlet and outlet chambers for a motive fluid, directional vanes in the walls of the casing spaced to form apertures therebetween, a rotor and a driving shaft secured thereto turnably mounted in the engine casing, and radial spaced impeller blades arranged peripherally about the rotor and in frusto-conoidal groups which are individually turnable upon the rotor for changing the angular position of the blades of each group with relation to the axis of the rotor, the rotors comprising central body members and an outer ring in which the ends of the groups of blades are supported, said outer ring being rigidly connected to the central body portion, said body portion being formed of separable sections forming an inner chamber.

3. A turbine engine comprising a casing with inlet and outlet chambers for a motive fluid, directional vanes in the walls of the casing spaced to form apertures therebetween, a rotor and a driving shaft secured thereto turnably mounted in the engine casing, radial spaced impeller blades arranged peripherally about the rotor and in frusto-conoidal groups which are individually turnable upon the rotor for changing the angular position of the blades of each group with relation to the axis of the rotor, the rotors comprising central body members and an outer ring in which the ends of the groups of blades are supported, said outer ring being rigidly connected to the central body portion, said body portion being formed of separable sections forming an inner chamber, and means operable in the inner chamber for angularly adjusting the groups of blades.

4. A prime mover of the type involving a chamber with directional vanes for diverting the stream of a moving motive fluid and a rotor turnably mounted in the chamber, frusto-conoidal groups of blades radially spaced as to the center of the rotor, said rotor comprising a body portion with a central chamber and radial bearings, spindles turnable in said bearings connected to the groups of blades, gears mounted in the chamber of the rotor body and a member engaging one of said gears for turning the same independently of the rotor and thereby actuating the spindles synchronously in the same direction to turn said groups with relation to the body of the rotor, so that the moving motive fluid traversing the passageways of the chamber will react with an impelling force upon the impeller blades according to the angular position of the same upon the rotor and by which force the direction of rotation of the rotor will be determined as the blades are turned from one side to the other to intersect an axial plane of the rotor.

5. A prime mover of the type involving a chamber with directional vanes for diverting the stream of a moving motive fluid and a rotor turnably mounted in the chamber, frusto-conoidal groups of blades radially spaced as to the center of the rotor, said rotor comprising a body portion with a central chamber and forming radial bearings, spindles turnable in said bearings connected to the groups of blades, gears mounted in the chamber of the rotor body and a member engaging one of said gears for turning the same independently of the rotor and thereby actuating the spindles synchronously in the same direction to turn said groups with relation to the body of the rotor, so that the moving motive fluid traversing the passageways of the chamber will react with an impelling force upon the impeller blades according to the angular position of the same upon the rotor and by which force the direction of rotation of the rotor will be determined as the blades are turned from one side to the other to intersect an axial plane of the rotor, said device comprising a spirally threaded shaft engaging a complementary threaded portion of the gear thereon.

6. A motive fluid turbine engine comprising a casing with a series of chambers arranged co-axially, a motive fluid inlet head at one end of the chambers and a discharge chamber at the opposite end with circumferentially spaced radial directional vanes fixed in the chambers for diverting the stream of the moving motive fluid through the chambers, individual rotors with spaced impingement blades movable through the stream of the motive fluid, coupling members for rotatably joining each of the rotors in the casing, said impingement blades being arranged in frusto-conoidal radial groups, and circumferentially spaced radial directional vanes secured to the rotor and substantially embracing the conoidal groups of impelling blades.

7. In a turbine engine, a casing having inlet and outlet ports, two circumferential spaced series of radial guide vanes rigidly connected to the casing, a rotor having peripheral seats, a ring surrounding the rotor in spaced relation thereto and having seats, radial blades having heads which latter are turnably engaged in the respective seats of the rotor and ring, inner bearing rings secured to the rotor on opposite sides thereof, outer bearing rings secured on opposite sides of the first named ring, filler blades secured at their respective ends to the inner and outer bearing rings, and means connected to the radial blades to adjust same in said seats.

8. In a turbine engine, a casing having inlet and outlet ports, two circumferential spaced series of radial guide vanes rigidly connected to the casing, a rotor having peripheral seats, a ring surrounding the rotor in spaced relation thereto and having seats, radial blades having heads which latter are turnably engaged in the respective seats of the rotor and ring, inner bearing rings secured to the rotor on opposite sides thereof, outer bearing rings secured on opposite sides of the first named ring, filler blades secured at their respective ends to the inner and outer bearing rings, said rotor having a chamber, a gear in the chamber, means to rotate the gear, and pinions connected to the radial blades and meshed with the gear whereby to adjust the blades by means of said gear.

9. In a turbine engine, a casing having inlet and outlet ports, fixed direction vanes in the casing, a rotor in the casing, radial blades movably connected to the rotor, pinions connected to the blades, and a gear common to all of the pinions and in mesh therewith for actuating all of the latter and therewith the blades in unison.

10. In a turbine engine, a casing having inlet and outlet ports, two series of fixed direction vanes in the casing, a rotor in the casing, adjustable radial blades carried by the rotor, and filler vanes arranged on opposite sides of the blades and between the fixed vanes of the casing and being connected to the rotor to move therewith.

11. In a turbine engine, a casing having inlet and outlet ports, two series of fixed direction vanes in the casing, a rotor in the casing, adjustable radial blades carried by the rotor and having their sides flaring outwardly, and filler vanes having inclined sides conforming to the taper of the flared sides of the blades and arranged on opposite sides of the latter and between the fixed vanes of the casing and being connected to the rotor to move therewith.

12. In a turbine engine, a casing having inlet and outlet ports, a series of rotors in the casing, a shaft, couplings on the shaft for connecting adjacent rotors to each other, means to rigidly connect one of the rotors to the shaft, said couplings having angular faced portions which are received in angular shaped openings in the respective rotors and having other portions which are keyed to the next adjacent rotor and which support the latter.

13. In a turbine engine, a casing having inlet and outlet ports, a rotor in the casing having a chambered central part, a gear in said chambered part, radial blades pivotally connected to the rotor, pinions on the inner ends of the blades in mesh with the gear, a ring surrounding the blades and providing pivotal supports for the latter, and vanes connected to the ring and to the rotor and arranged on opposite sides of the blades.

14. In a turbine engine, a casing having inlet and outlet ports, a rotor having adjustable radial blades, fixed vanes in the casing arranged in two spaced series, and filler means borne by the rotor and arranged on opposite sides of the blades and between the vanes.

In testimony whereof I have hereunto set my hand in the presence of two subscribing witnesses.

JOHN ALLEN.

Witnesses:
JOHN H. HERRING,
W. W. HEALEY.

Copies of this patent may be obtained for five cents each, by addressing the "Commissioner of Patents, Washington, D. C."